US009709021B2

(12) United States Patent
Frtunik et al.

(10) Patent No.: US 9,709,021 B2
(45) Date of Patent: Jul. 18, 2017

(54) WAVE POWER GENERATOR

(71) Applicant: DDNT CONSULTANTS AUSTRALIA PTY LTD, Sydney (AU)

(72) Inventors: Dalibor Frtunik, Sydney (AU); George Brawley, Sydney (AU)

(73) Assignee: DDNT CONSULTANTS AUSTRALIA PTY LTD, Sydney (AU)

( * ) Notice: Subject to any disclaimer, the term of this patent is extended or adjusted under 35 U.S.C. 154(b) by 0 days.

(21) Appl. No.: 14/406,137

(22) PCT Filed: Jun. 5, 2013

(86) PCT No.: PCT/AU2013/000597
§ 371 (c)(1),
(2) Date: Dec. 5, 2014

(87) PCT Pub. No.: WO2013/181702
PCT Pub. Date: Dec. 12, 2013

(65) Prior Publication Data
US 2015/0145250 A1    May 28, 2015

(30) Foreign Application Priority Data
Jun. 5, 2012   (AU) .............................. 2012902349

(51) Int. Cl.
*F03B 13/10* (2006.01)
*F03B 13/20* (2006.01)
(Continued)

(52) U.S. Cl.
CPC .............. *F03B 13/20* (2013.01); *F03B 13/10* (2013.01); *F03B 15/00* (2013.01); *H02K 7/1876* (2013.01);
(Continued)

(58) Field of Classification Search
CPC ............ H02P 2101/10; F05B 2270/706; F05B 2270/00; F05B 2270/707; F03B 15/00; F03B 13/10; F03B 13/20
(Continued)

(56) References Cited

U.S. PATENT DOCUMENTS 3,696,251 A * 10/1972 Last .................... F03B 13/1855
290/53
4,352,023 A *  9/1982 Sachs ...................... F03B 13/20
290/42

(Continued)

FOREIGN PATENT DOCUMENTS

DE        10055846 A1     5/2002
EP         1691072 A1     8/2006
(Continued)

OTHER PUBLICATIONS

Extended European Search Report dated Jan. 22, 2016 in EP Application No. 13800966.7-1610.
(Continued)

*Primary Examiner* — Julio C Gonzalez
(74) *Attorney, Agent, or Firm* — Knobbe Martens Olson & Bear LLP

(57) ABSTRACT

A wave power generator comprises a buoyant casing (500) intended to float in a body of water. An electric machine (103) located within the casing has an armature and a field source, the electric machine having a fixed part coupled to the casing and a moving part. A counterweight assembly (104) is movable within the casing, comprising the moving part of the electric machine and wherein a relative movement of the counterweight assembly and the fixed part of the electric machine generates electric power. Power storage (400) stores power generated by the electric machine and a control system (200) determines a bi-directional energy flow between the power storage and the armature, wherein energy (Continued)

is returned to the electric machine to drive a motion of the counterweight assembly anti-symmetrically to a motion of the casing.

22 Claims, 12 Drawing Sheets

(51) Int. Cl.
  *H02K 35/02* (2006.01)
  *H02K 7/18* (2006.01)
  *F03B 15/00* (2006.01)
  *H02K 16/00* (2006.01)
  *H02P 101/10* (2015.01)

(52) U.S. Cl.
  CPC ........ *H02K 35/02* (2013.01); *F05B 2220/707* (2013.01); *F05B 2250/293* (2013.01); *F05B 2270/00* (2013.01); *F05B 2270/706* (2013.01); *H02K 16/00* (2013.01); *H02P 2101/10* (2015.01); *Y02E 10/38* (2013.01); *Y02E 20/14* (2013.01)

(58) Field of Classification Search
  USPC ........... 290/42, 43, 53; 405/76; 60/498, 495, 60/501, 504, 505, 496, 502; 417/331, 417/333
  See application file for complete search history.

(56) References Cited

U.S. PATENT DOCUMENTS

| | | | |
|---|---|---|---|
| 6,864,592 B1 | 3/2005 | Kelly | |
| 7,443,046 B2* | 10/2008 | Stewart | F03B 13/20 290/42 |
| 2007/0257491 A1 | 11/2007 | Kornbluh et al. | |
| 2007/0273156 A1* | 11/2007 | Miyajima | F03B 13/20 290/53 |
| 2009/0085357 A1* | 4/2009 | Stewart | F03B 13/16 290/53 |
| 2010/0228401 A1* | 9/2010 | Hench | F03B 13/20 700/287 |
| 2012/0001432 A1* | 1/2012 | Clement | F03B 13/20 290/53 |
| 2012/0248774 A1* | 10/2012 | Stewart | F03B 13/20 290/53 |
| 2012/0248775 A1* | 10/2012 | Stewart | F03B 11/00 290/53 |
| 2013/0226349 A1* | 8/2013 | Siegel | F03B 13/183 700/275 |
| 2013/0341921 A1* | 12/2013 | Beane | F03B 13/20 290/42 |
| 2015/0152835 A1* | 6/2015 | Frtunik | H02K 35/02 290/53 |

FOREIGN PATENT DOCUMENTS

| | | |
|---|---|---|
| JP | 2007132336 A | 5/2007 |
| RU | 2037642 C1 | 6/1995 |
| UA | 15401 C2 | 6/1999 |
| WO | 9626364 A2 | 8/1996 |
| WO | 2013/005668 A1 | 1/2013 |

OTHER PUBLICATIONS

Office Action issued Feb. 15, 2017 in corresponding RU Application No. 2014153116/06(084908).

* cited by examiner

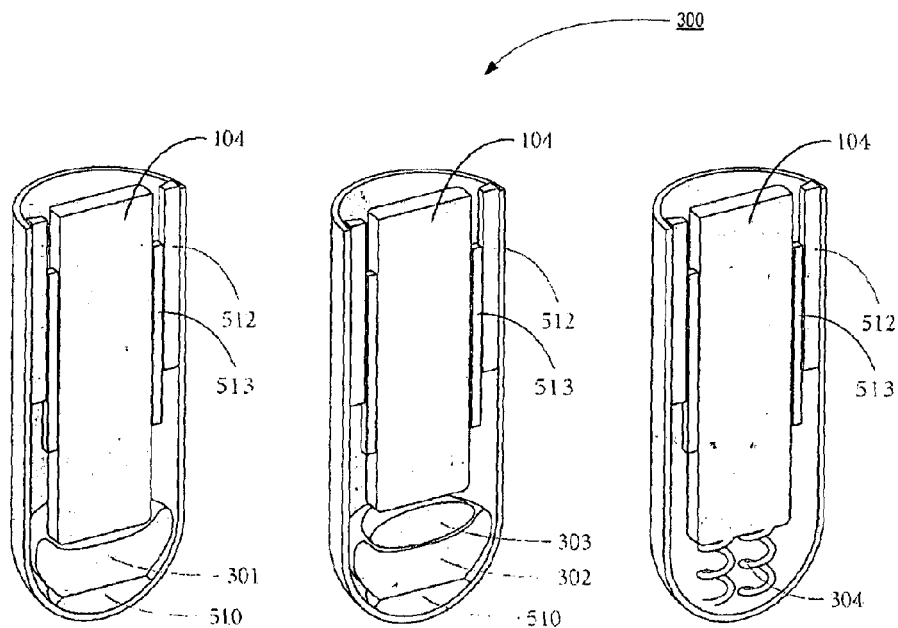
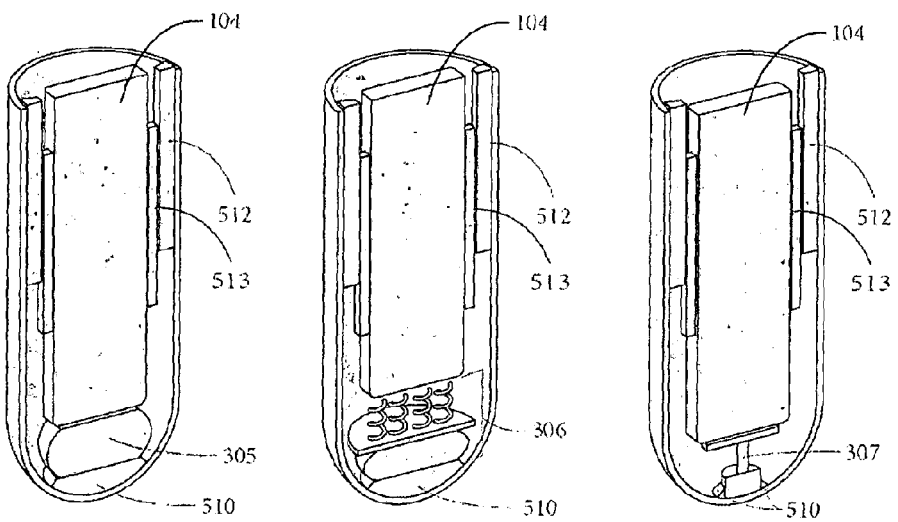
FIG. 3A  FIG. 3B  FIG. 3C  FIG. 3D  FIG. 3E  FIG. 3F

WAVE POWER GENERATOR

CROSS-REFERENCE TO RELATED APPLICATIONS

This application is the U.S. National Phase under 35. U.S.C. §371 of International Application PCT/AU2013/000597, filed Jun. 5, 2013, which claims priority to Australian Patent Application No. 2012902349, filed Jun. 5, 2012. The disclosures of the above-described applications are hereby incorporated by reference in their entirety.

FIELD OF THE INVENTION

The present disclosure relates to ocean wave power generation devices, in particular a device that can be deployed as a hermetically sealed buoy that actively optimizes its own motion to increase power extracted from ocean waves.

BACKGROUND OF THE INVENTION

There have been many proposals for devices that generate electricity from the motion of ocean waves for over a century. Such devices generally attempt to convert ocean waves into motion that can be used to drive a turbine or linear motor to produce electricity, with the majority of devices falling into the former category. Some devices do not generate electricity directly, but convert the mechanical energy of ocean waves to another form of mechanical energy that can be used to do work.

Many problems confront the successful commercial exploitation of power from ocean waves.

The ocean is a difficult environment. The ocean tends to damage any exposed object, from those externally simple as ship hulls, to moving propellers. Exposed moving parts are most susceptible to damage. This contributed to the early commercial failure, for example, of the Pelamis wave converter, which required constant, expensive maintenance. A lack of robustness makes practical power generation impossible.

Ocean waves are not regular and do not provide a constant motion. Power generators based on motion rely on the motion being constant in one direction for a period of time. Ocean waves change 'direction' with every single wave as it peaks and troughs. This is typically overcome by converting the mechanical potential energy in a wave into another type of energy (e.g. pumping water or turning a rotary turbine). Conversions of energy lead to inefficiencies.

Mooring is often a problem. Many devices use a fixed mooring or heavy weight as a 'mechanical ground.' A mooring that can withstand being so used is expensive and difficult to install, as well as being impractical in deeper waters. A separate 'mechanical ground' is expensive to transport and makes device service more expensive by restricting the mobility and accessibility of a device.

The periodicity and amplitude of ocean waves is stochastic, which can cause low efficiency in power generation. This issue is generally addressed either in the same way as the previous issue, leading to the same inefficiencies, or by optimizing for a particular set of ocean wave parameters, leading to sub-optimal efficiency.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to a first aspect of the invention there is provided a wave power generator comprising:
a buoyant casing intended to float in a body of water;
an electric machine located within the casing comprising an armature and a field source, the electric machine having a fixed part coupled to the casing and a moving part;
a counterweight assembly that is movable within the casing, comprising the moving part of the electric machine and wherein a relative movement of the counterweight assembly and the fixed part of the electric machine generates electric power;
power storage that stores power generated by the electric machine;
a control system that determines a bi-directional energy flow between the power storage and the armature, wherein energy is returned to the electric machine to drive a motion of the counterweight assembly anti-symmetrically to a motion of the casing.

According to a second aspect of the invention there is provided a wave power generator comprising:
a buoyant casing intended to float in a body of water;
an electric machine located within the casing comprising an armature and a field source, the electric machine having a fixed part coupled to the casing and a moving part;
a counterweight assembly that is movable within the casing, comprising the moving part of the electric machine and wherein a relative movement of the counterweight assembly and the fixed part of the electric machine generates electric power;
power storage that stores power generated by the electric machine;
a control system that determines a bi-directional energy flow between the power storage and the armature, wherein energy is returned to the electric machine to drive a motion of the casing to a multiple of a period of waves in the body of water.

According to a third aspect of the invention there is provided a method of generating electrical power comprising:
a) deploying a wave power generator in a body of water, the generator comprising:
  i) a buoyant casing;
  ii) an electric machine located within the casing comprising an armature and a field source, the electric machine having a fixed part coupled to the casing and a moving part;
  iii) a counterweight assembly that is movable within the casing, comprising the moving part of the electric machine and wherein a relative movement of the counterweight assembly and the fixed part of the electric machine generates electric power; and
  iv) power storage that stores power generated by the electric machine;
b) determining a bi-directional energy flow between the power storage and the armature, and
c) returning energy to the electric machine based on the determined energy flow, to drive a motion of the counterweight assembly anti-symmetrically to a motion of the casing.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIGS. 3A to 3F show a schematic diagrams of force restoring components used in the generator of FIG. 1.

DETAILED DESCRIPTION OF THE EMBODIMENTS

Figure 1:
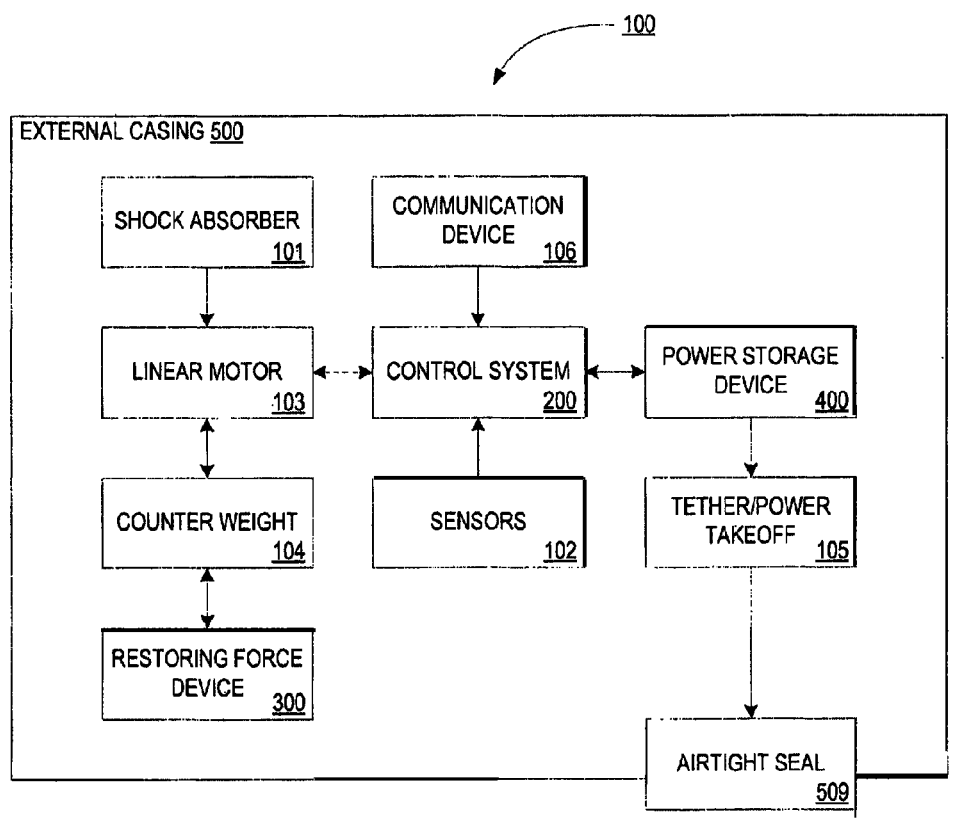
FIG. 1 shows a block diagram of a wave power generator.

FIG. 1 shows a power generation device 100 with an electric machine 103 that operates as a linear motor or generator mounted inside a hermetically sealed casing 500 of a buoy that floats in a body of water such as the ocean. The field source of the linear motor/generator 103 is coupled with a counterweight 104 which in use moves along the vertical axis of the buoy. As described in more detail below, the counterweight 104 is seated on a device 300 that provides a restoring force in response to the motion of the counterweight. This configuration removes the need for a mechanical ground, allowing both the counterweight 104 and external casing 500 to move freely during operation.

The components of device 100 are contained within the hermetically-sealed external casing 500, though the power takeoff 105 needs to penetrate this casing without breaking the seal. Such a configuration increases the resistance of the device 100 to environmental damage, reducing maintenance requirements and increasing operational lifespan. This may be achieved using an airtight seal 509 such as a pass-through hydraulic seal. The cable used for the power takeoff 105 may be a transmission line with cladding optimized for underwater transmission, such as Siemens' HDVC Plus. Cables may be selected that can serve as a tether for the device 100. Alternatively the cable may be integrated into a tether cable attached to the external casing 500. The external casing 500 may have an anti-fouling coating.

The device 100 includes a shock absorber 101 that limits the linear motor's field source and counterweight 104 from heavily impacting and possibly damaging the top of the casing 500 in heavy seas. The shock absorber 101 may be an elastomer bushing, air spring, or similar cushioning device.

The linear motor 103 may be a synchronous or induction motor. For example, the linear motor 103 may have a magnet field source and coil armature, with three phases of coil repeated along the length of the armature. This motor 103 is optimized for continuous, efficient, low-velocity operation. This may, for example, involve maximizing the windings used, and using an induction motor where the stator contains no iron (as high induced magnetic fields might attract the parts of the linear motor, straining the mechanical parts of the motor).

The mass of the counter weight 104 is chosen for optimal power generation for the expected range of wave periods a given device configuration is expected to be subjected to. In one arrangement the counter weight 104 is a heavy metal cylinder. Alternative arrangements feature different materials whose densities affect their size and the dimensions of the device. For example, reinforced concrete may provide an appropriate density for the projected vertical dimension of a device, or denser metals employed to reduce the vertical dimension when so desired. The counterweight is preferably not magnetic as this would interfere with the linear motor above it.

A control system 200 communicates with the linear motor 103 and also a power storage device 400 such as a bank of capacitors housed within the casing 500. The control system 200 mediates the transfer of power to and from the power storage device 400 and the electric machine 103. The power takeoff 105 outputs power from the power storage device 400 via the airtight seal 509. The power storage device 400 may be integrated with the counterweight 104, in which case the power storage device is connected to the inverter by a flexible cable.

Sensors 102 measure the position of the field source of linear motor/generator 103 relative to the external casing 500 and other parameters (such as the device's height above the ocean waves). This information is used by a combined energy management and control system 102 to return energy to the system, bringing the motion of the field source and counterweight into antisymmetric resonance with the casing. This is considered to maximize the energy generated by the device 100.

The device 100 may also have a communication device 106, which may be a wireless communication unit, short-range radio transmitter, or similar device, that is used to transmit information about the device 100 to a receiver (not shown). The communication device 106 enables the device 100 to receive signals that may, for example, be used to cause the device to lock the counterweight 104 into position for ease of transportation, or to update programmable elements of the control system. The communication device may also operate over a line, such as an optical fibre, that is part of the tether/power takeoff arrangement 105.

In an alternative configuration the armature of the electric machine 103 may be coupled to the counterweight 104 and free to move within the casing, while the field source is fixed relative to the casing. In this case a flexible cable may join the moving armature to the electrical system.

The device 100 may have a system for fixing the counterweight assembly in place, similar to an elevator brake. This is used to reduce the amplitude of motion of the device in the event that the device requires maintenance, or ocean conditions are too rough for normal operation. Additional microcontrollers may be used, which may be connected to the communications device(s) 106 or governed by separate algorithms that use signals from the sensors 102 as input (for example, to determine when the sea is becoming too rough). Thus, for example, before maintenance of the device, a signal may be sent to the communication device 106 in order to fix or restrain the counterweight 104.

Figure 2A:
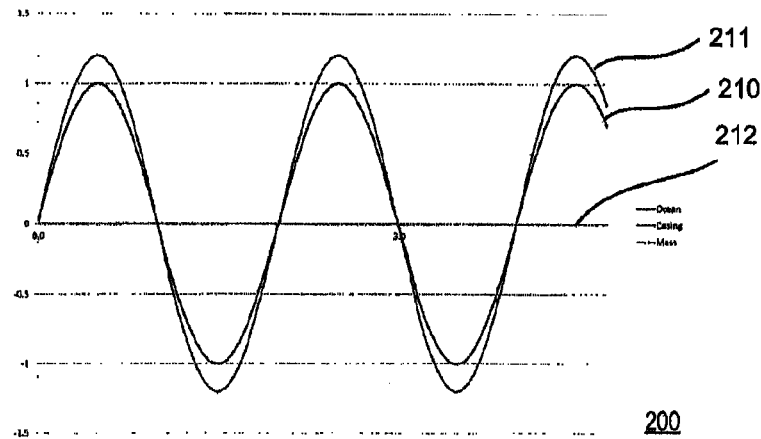
FIGS. 2A-2C show graphs of idealized performance of the wave power generator of FIG. 1 compared with the performance of alternative arrangements.
Figure 2B:
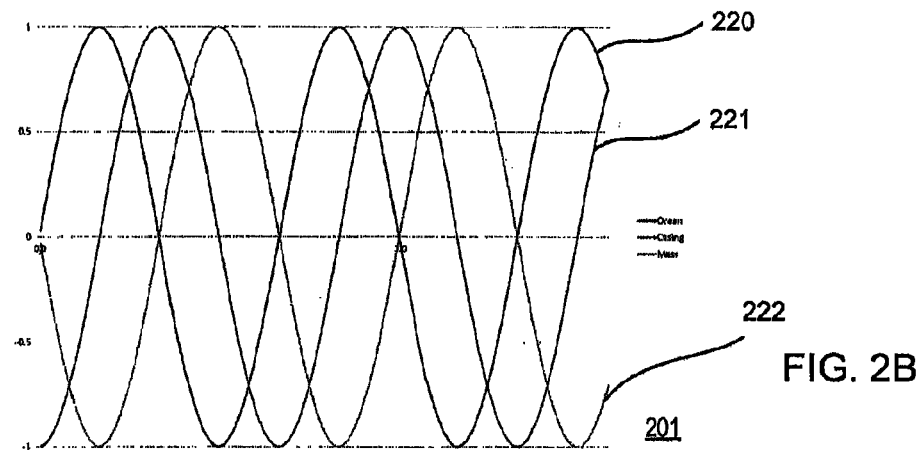
Figure 2C:
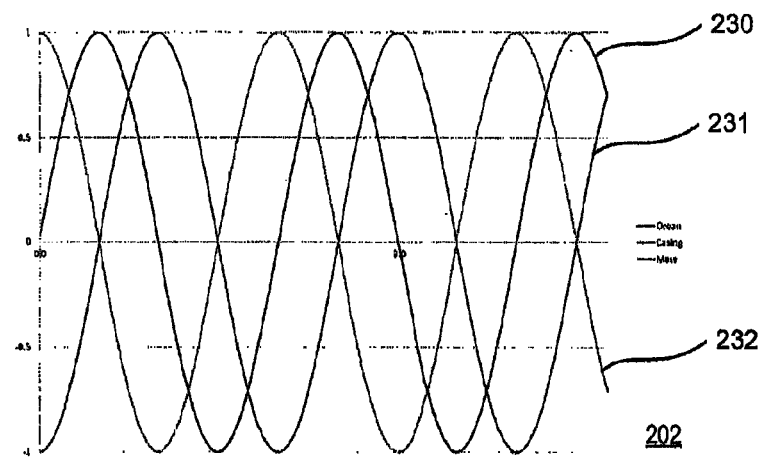

FIGS. 2A-C show simulation results comparing the performance of device 100 with the operation of other approaches.

FIG. 2A shows the motion 211 of a buoyant casing moving in resonance with periodic ocean wave 210 (modelled as a normalised sinusoid for illustrative purposes). The relative velocity between this casing and a stationary mechanical ground 212 may be used in conventional devices to generate power with a linear motor. The average velocity of the casing is proportional to the magnitude of the casing's motion 211, which is fractionally greater than the magnitude of the ocean waves 210 (its magnitude enhanced by its resonant motion).

FIG. 2B shows the motion 221 of a free-floating buoyant casing with a free mass coupled to the casing by a spring. The motion of the free mass is shown as curve 222 and as before the ocean wave is modelled as a normalised sinusoid 220. The phase of motion of the casing 221 is shifted by ninety degrees relative to the ocean 220; in turn, the phase of motion of the free mass 222 is shifted by ninety degrees relative to the motion of the casing 221. The relative velocity between the casing and mass is proportional to the magnitude of the casing's motion, which is approximately equal to that of the magnitude of the ocean waves in ideal conditions. This generates less power than the driven, resonant system in FIG. 2C.

FIG. 2C illustrates the operation of device 100, assuming an input of a normalised sinusoidal ocean wave 230. FIG. 2C shows the motion 231 of a free-floating buoyant casing (e.g. casing 500) with the motion 232 of a free mass driven to move in antisymmetric resonance with the motion of the casing. In this arrangement the relative velocity between the casing and mass is proportional to twice the magnitude of the casing's motion, which is approximately equal to that of the magnitude of the ocean waves in ideal conditions. This arrangement generates more power than either of the systems illustrated in FIGS. 2A and 2B. The free mass in this example corresponds to a system including the counterweight 104 and the field source of the linear motor 103.

In practise, the magnitude of the motion of casing 500 is increased by the control systems described herein, further increasing the power output of device 100.

Restoring Force Devices

The field source of the linear motor 103 is attached to a counterweight 104 and this assembly is acted on by a restoring force device 300. FIG. 3A shows an arrangement in which the restoring force device is a rolling-lobe air spring 301, such as a Goodyear® rolling lobe air spring. This air spring 301 is joined to a mount 510 on the base of the external casing and the base of the counterweight 104. The counterweight moves within the casing using linear bearings with a mobile component 513 and a fixed component 512.

FIG. 3B shows an arrangement in which the counterweight 104 rests on an air spring 303 that in turn rests on an elastomer bushing 302. The bushing is located on the mount 510.

FIG. 3C shows an arrangement in which the counterweight 104 is coupled to the casing by springs 304, which apply a restoring force to the counterweight 104. FIG. 3D shows an arrangement in which the counterweight rests on an elastomer bushing 305 located on mount 510. Alternatively, as shown in FIG. 3F, the counterweight may be supported by a pneumatic piston 307 coupled to the casing by mount 510.

The restoring force device 300 may include a combination of the aforementioned elements. For example, FIG. 3E shows a restoring force device having springs 304 and an elastomer bushing 305 coupled by linkages 306.

The rolling lobe air spring has a number of useful features, including:
1. a long stroke;
2. a constant response over the long stroke; and
3. a small damping rate.

These features assist in maintaining an appropriate response by the system to the ocean period, which is of the order of seconds and is longer than the period of most air spring applications. Restoring force device may also be provided that counteract upward motion of the counterweight assembly.

Simulated Device Operation

The control system 200 returns power from the power storage device 400 to the linear motor 103 to bring the field source and counterweight 104 into antisymmetric resonance with the casing. This is illustrated in the simulation results of FIGS. 4A to 4C. FIG. 4C shows a graph with time on the x-axis in which the device operates in an ocean modelled as a normalized sine wave 410. As the control system varies the power takeoff and return, the casing and mass are brought into antisymmetric resonance. Curve 412 shows the motion of the mass (ie the counterweight and field source of the linear motor 103) and curve 411 shows the motion of the casing 500.

Figure 4A:
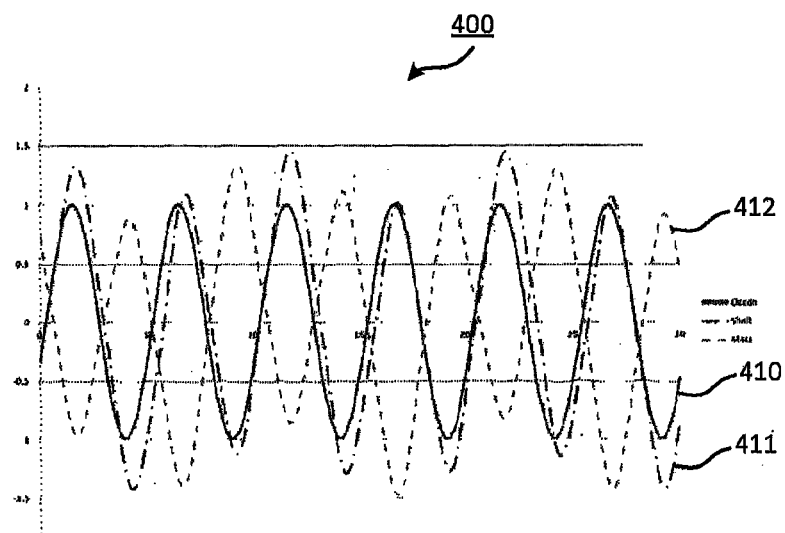
FIG. 4A shows graphs of the simulated motion of an idealized version of the generator of FIG. 1.
Figure 4B:
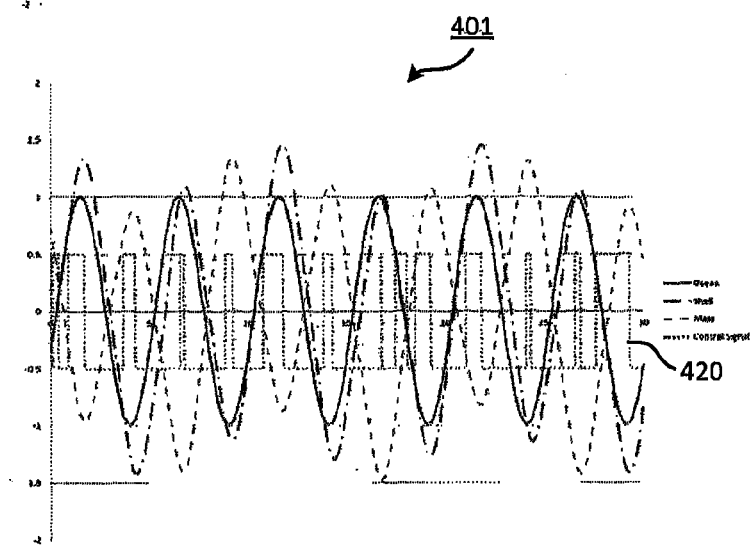
FIG. 4B shows an example of a control signal for the motion of FIG. 4A.
Figure 4C:
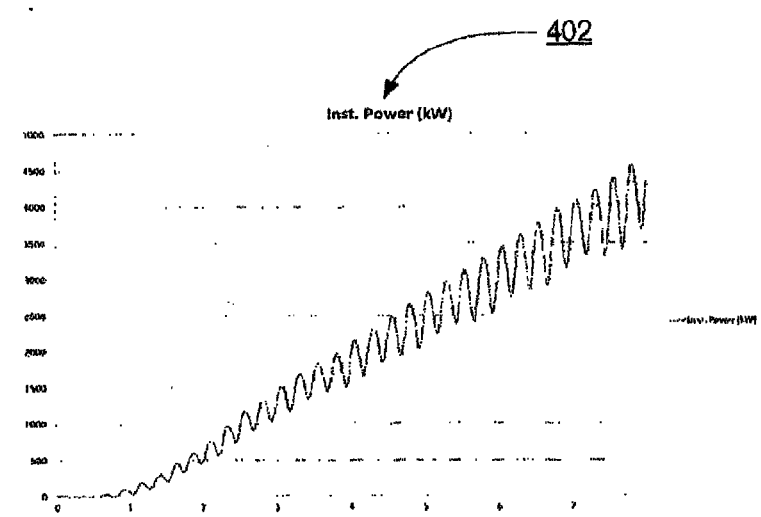
FIG. 4C shows an example of power generated in the wave power generator.

FIG. 4B shows an example graph of the control signals 420, overlaid on the plots of FIG. 4A. The control signal 420 is a series of binary pulses that determine when power is withdrawn or returned to the linear motor to drive the motion of the free mass. These pulses are normalized by a multiple of the restoring force acting on the free mass, as measured by the sensors 102. This ensures the returned or withdrawn energy is proportional to the current motion of the system. The restoring force may be measured directly or may be estimated based on other measurements, for example acceleration of a known mass.

FIG. 4C shows the power 402 generated by the system 100 over an 80-second simulation run driven by a sine wave. Dips in the power correspond to power being returned to the system to bring it into antisymmetric resonance and maintain this antisymmetric resonance.

Casing Designs and Components

Figure 5:
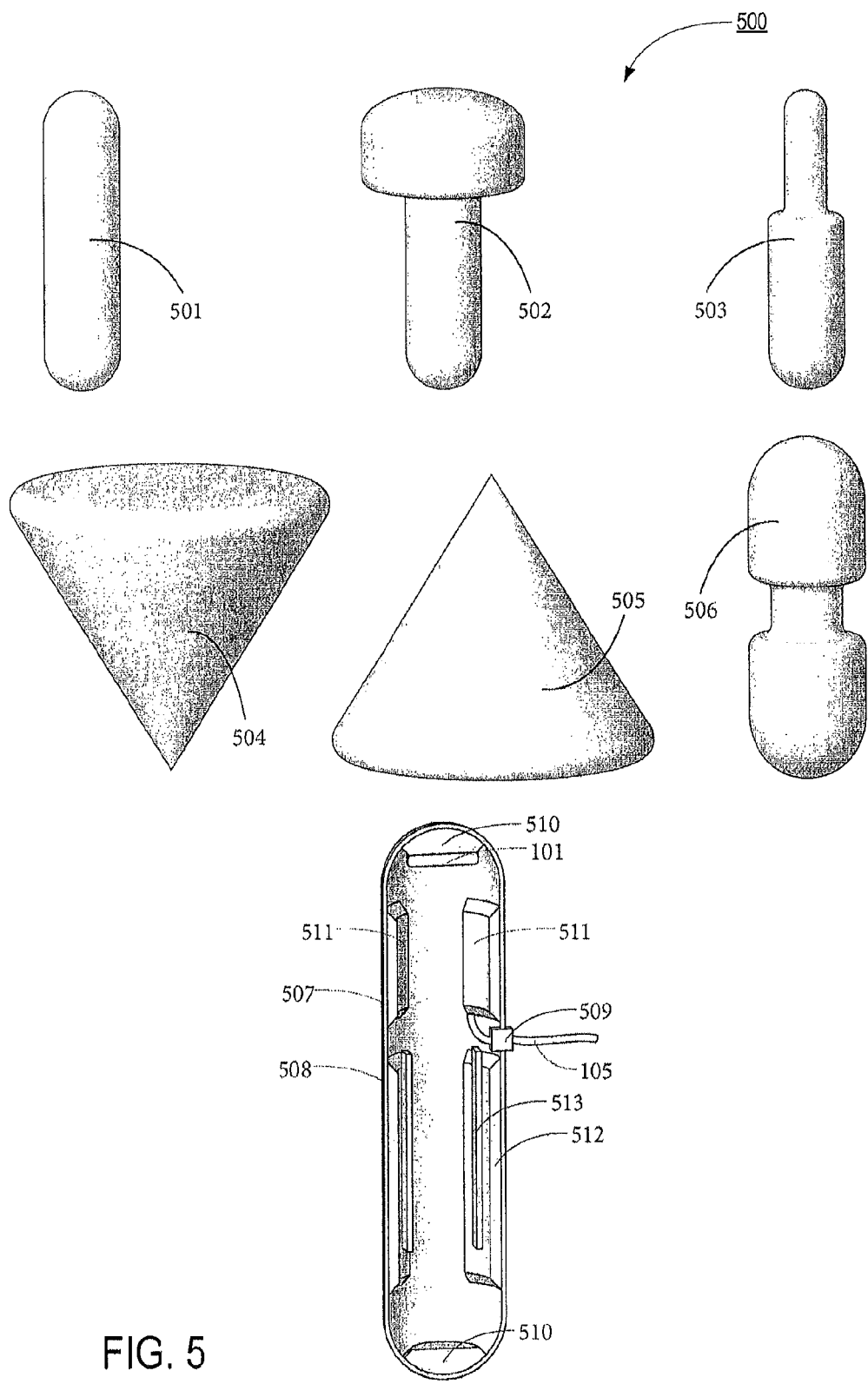
FIG. 5 shows schematics of different casings for the wave power generator, and components that are integrated with the casing.

Most components of the device 100 are enclosed within the hermetically sealed external casing 500. The casing is made of a durable material suited to an ocean application. As illustrated in FIG. 5, the device utilizes a steel casing 507 for durability with a coating 508 to combat fouling. Many other material combinations are possible, having due regard to durability and fouling prevention regardless of material choice. A design consideration for the anti-fouling coat is its longevity, reducing the requirement for out-of-the-water maintenance.

The interior of the casing 507 is lined with cylindrical linear bearings, such as SKF's profile rail guides, having a mobile component 513 and a component 512 that is stationary with respect to the casing. The bearings are selected to provide a low resistance to the motion of the field source/counterweight system while preventing the free mass from moving horizontally. The linear bearing 512, 513 is optimized for low friction and the mass of the counterweight.

Mount 510 is located at the base of the casing 507 to support the restoring force device 300. Another mount 510 is located at the top of interior of the casing to support the shock absorber 101. Other features of the casing include a pass-through hydraulic seal 509, connecting the power take-off 105 to the internal compartment of the device, and mounts 511 for the armature of linear motor 103 and energy storage device 400.

FIG. 5 shows a range of different shapes for the casing. Casing 501 is generally cylindrical, with a rounded top and bottom. Casing 502 is cylindrical and has a wider upper section, to house the linear motor armature and energy storage device. Alternate embodiments may feature different shapes, for example:

Casing 503 is cylindrical with a wider lower section and correspondingly shorter counterweight (as part of the counterweight-field source system).

Casing 504 is conical, with the narrower end of the cone at the lower end of the casing. Casing 505 is conical, with the narrow end of the cone at the upper end of the casing. The non-cylindrical shapes may affect the resonant response of the buoy to the waves. A bi-conical buoy 506 may be used to double the naturally resonant frequency of the buoy when driven by the ocean. The buoy 506 has a large upper portion that narrows to a waist and then broadens to a wider lower portion.

The choice of casing shape is driven by efficiency and durability concerns.

Control System 200

Figure 6:
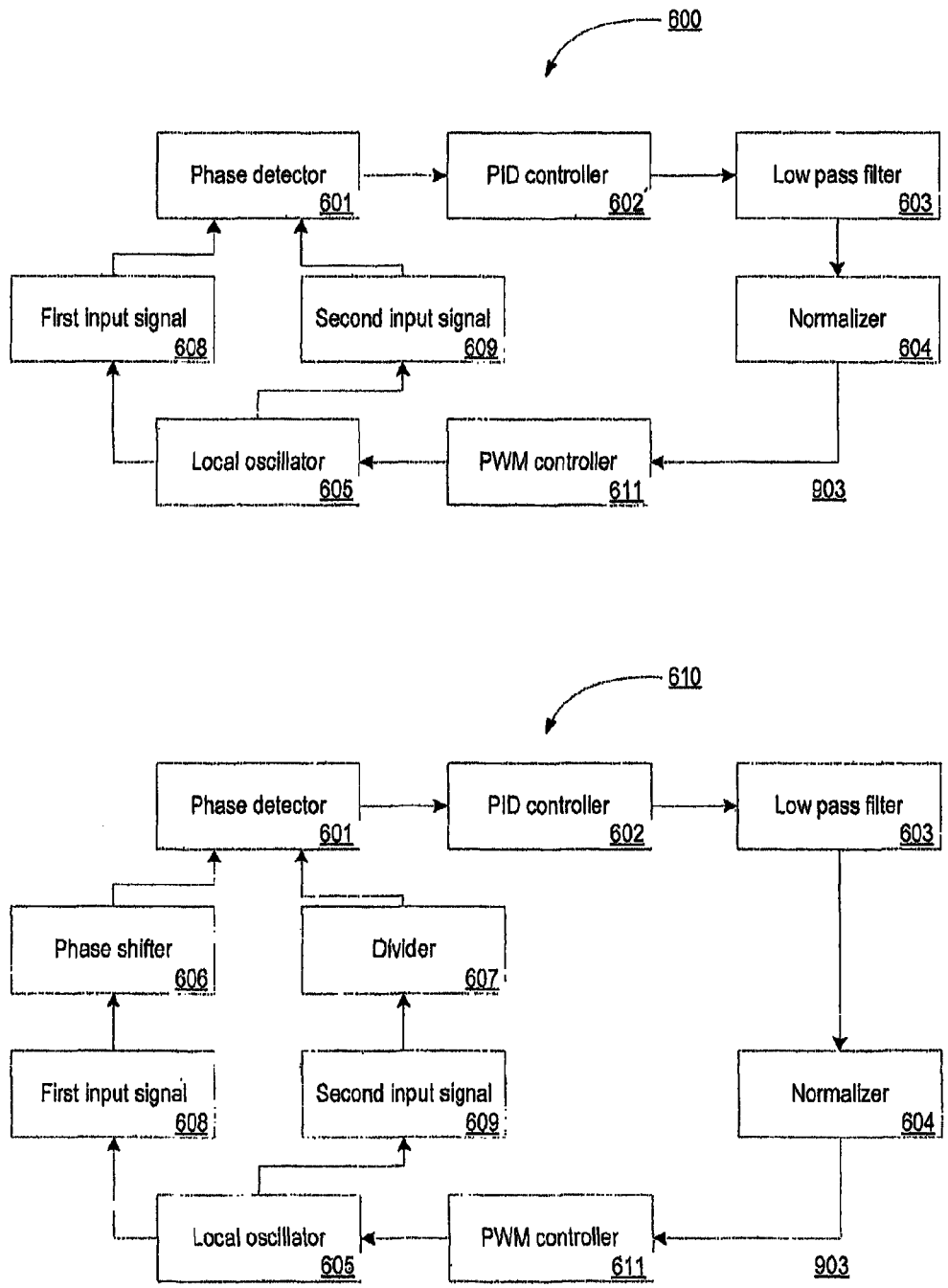
FIG. 6 shows block diagrams of phase locked loop controllers for use in the wave power generator.

FIG. 6 shows a block diagram 600 of a control system based on a phase locked loop (PLL) configuration. The control system 600 includes a phase detector 601, implemented in the present embodiment as a zero-crossing comparator of various control signals such as the first input signal 608 and the second input signal 609. In one arrangement the first input signal 608 is the relative position difference between the device casing and the ocean, and the second input signal 609 is the relative velocity of the casing and internal free mass. The use of these signals is further described below. The output signal of the phase detector 601 is fed into a proportional-integral-differential (PID) controller 602 (with an anti-windup mechanism). The output of the PID controller is passed through a low-pass filter 603 to ensure that only signals having the approximate phase of ocean waves are detected. The filtered signal is normalized by a normalizer 604 by the measured (or inferred) restoring force being supplied by the force restoring device attached to the free mass. The output 903 of the normalizer is fed into the controller 611 of the local oscillator 605, which is the linear motor 103 in this implementation. This controller 611 in one arrangement uses pulse width modulation (PWM) to add power from the device's electrical system back to the linear motor, or increase the damping on the motor to move power from the motor to the electrical system. The bidirectional power flow is managed with a full-bridge controller as discussed elsewhere.

The first and second input signals 608, 609 are measured or calculated signals indicative of a motion of the wave power generator. As discussed below, there are various input signals that could be used in the phase locking controller.

In other arrangements a controller 610 incorporates a phase shifter 606 that is used to modify an input signal. In the example of FIG. 6 the phase shifter 606 applies a phase shift to the first input signal 608 before the signal is received by the phase detector 601. The phase shifter 606 is used when locking a signal to a given phase that is shifted by a certain parameter. Such phase shifting is known from conventional PLL circuits. The control system 610 may also incorporate a divider 607 on one or more input signals which may be phase shifted to affect the rate of locking. In the example 610 of FIG. 6 the second input signal is processed by the divider 607 before being received by the phase detector 601.

The output signals 903 of the control system are used to control elements of the electrical system shown in FIG. 9 by pulse width modulation or a similar method.

The control system is implemented using integrated circuits (ICs) or a microcontroller. The control system is in data communication with the sensors 102 to provide control signals. As described herein, an energy store 400 is connected between a full bridge controller of the linear motor 103 and the power takeoff system 105.

An example of a phase locked loop (PLL) that may be used in the controller is ON Semiconductor's MC14046B. The PLL integrated circuit (IC) generally provides a phase comparator, source follower, and voltage-controlled oscillator. An external low-pass filter (such as Linear Technology's LTC1062CJ8-ND) may be supplied, and an analog or digital divider/multiplier IC may be used in the controller 610 operation, such as an Analog Devices Inc AD632AHZ-ND.

The device 100 may utilize a software implementation of the phase locked loop, residing on a microcontroller such as an Arduino or Microchip controller, though alternate embodiments may employ a microcomputer, digital signal processor (such as a Texas Instrument's C6713), or other similarly capable device. When implementing the PLL in software, all of the components of controller 600, 610 represent software modules passing data inputs and outputs between one another.

Alternative embodiments may use different control systems to achieve the same functional effect. For example, a microprocessor using signals from the sensors 102 implementing an optimal control may be used, returning a term that is used by the controller to return force or increase damping on the linear motor in order to maintain antisymmetric resonance between the casing and the mass. This may be achieved by altering properties such as the voltage across various phases of the electrical system (which includes the linear motor and power electronics, see FIG. 9). In such a control system the controller may, for example act to maximize a cost function that quantifies the antisymmetric resonance. The cost function may depend on the total kinetic energy of the system and so action to maximise the cost function may maximize the total kinetic energy. The cost function may depend on the total electrical power available to the system and so action to maximise the cost function may maximise the total electrical power available in the system.

The optimal control (or another control system) may be implemented on hardware not physically present in the body of the device, such that signals are transmitted from a processing station physically separate to the device that implements this control. This controller is still considered to form part of the system of the device.

Sensors

The sensors 102 may include an accelerometer (such as Analog Devices' ADXL330) and a position sensor. For the latter, the device 100 may use a quadrature position encoder (such as BEI Sensor's Industrial Encoder), which is used with many linear motors to measure position. A potentiometer, inductive position sensor, Hall Effect sensor, or similar device could also be used.

Velocity and relative position are the principal measurements used in the control loop 600, 610. Other sensors may be included in the device 100 to facilitate its operation, such as pressure sensors, humidity sensors, temperature sensors, voltmeters and ammeters. These additional sensors may be used to determine if the device 100 is in need of maintenance, and in general low-power sensors will be used. Such additional sensors add operational resilience.

Sensors may also be provided to measure an acceleration of the casing or an acceleration of the counterweight assembly. Further measurement may include the electrical current in the phase or phases of the electrical machine; the voltage across the phase or phases of the electrical machine; the electrical current flowing through power distribution components of the electrical machine; the electrical current flowing through the electrical components of the power control electronics; the voltage across the power distribution components of the electrical machine; the voltage across the electrical components of the power control electronics; and the phase of current in the phase or phases of the electrical machine.

Electrical System

Figure 9A:
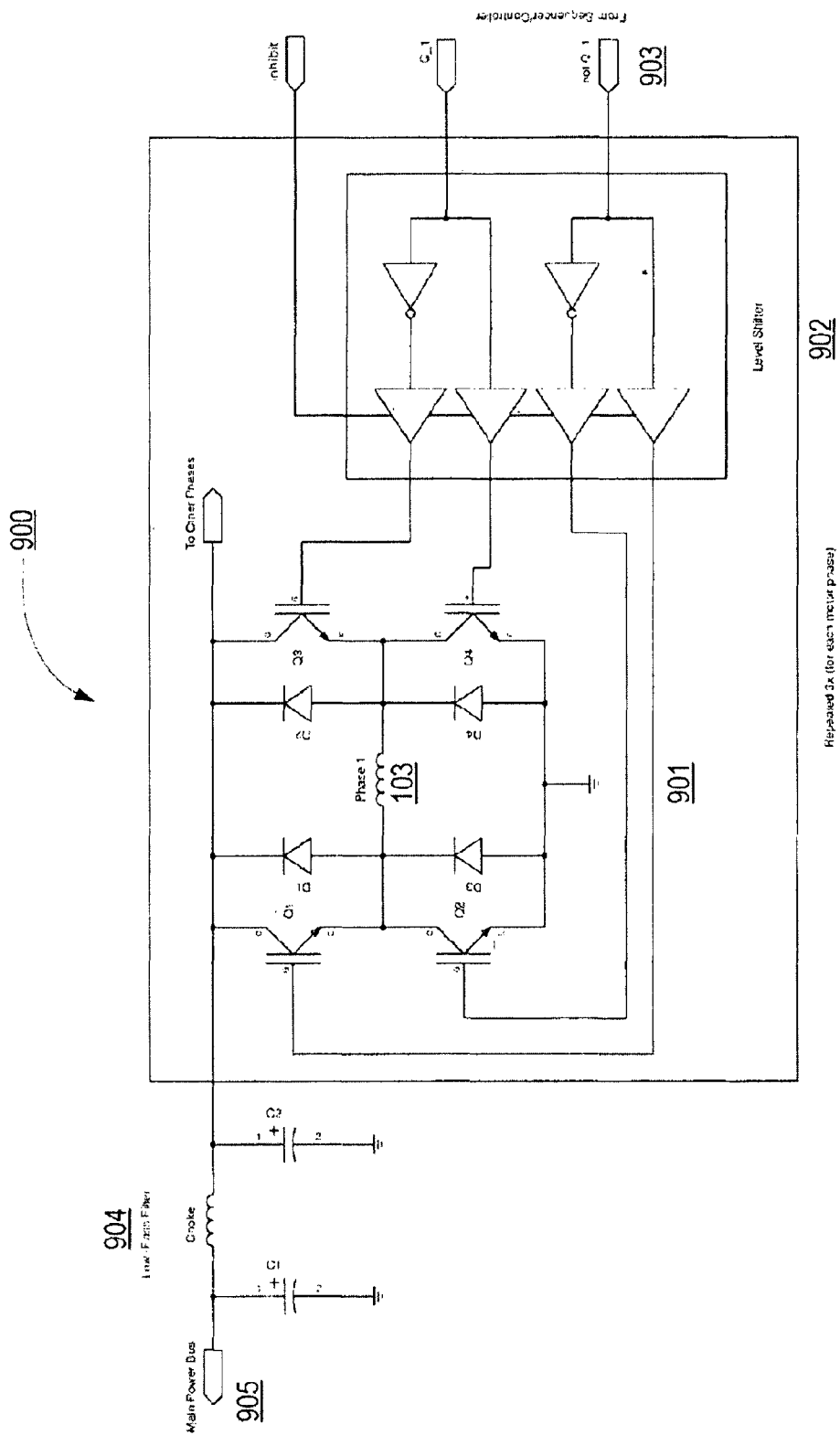
FIG. 9 shows embodiments of the electrical system of the wave power generator.
Figure 9B:
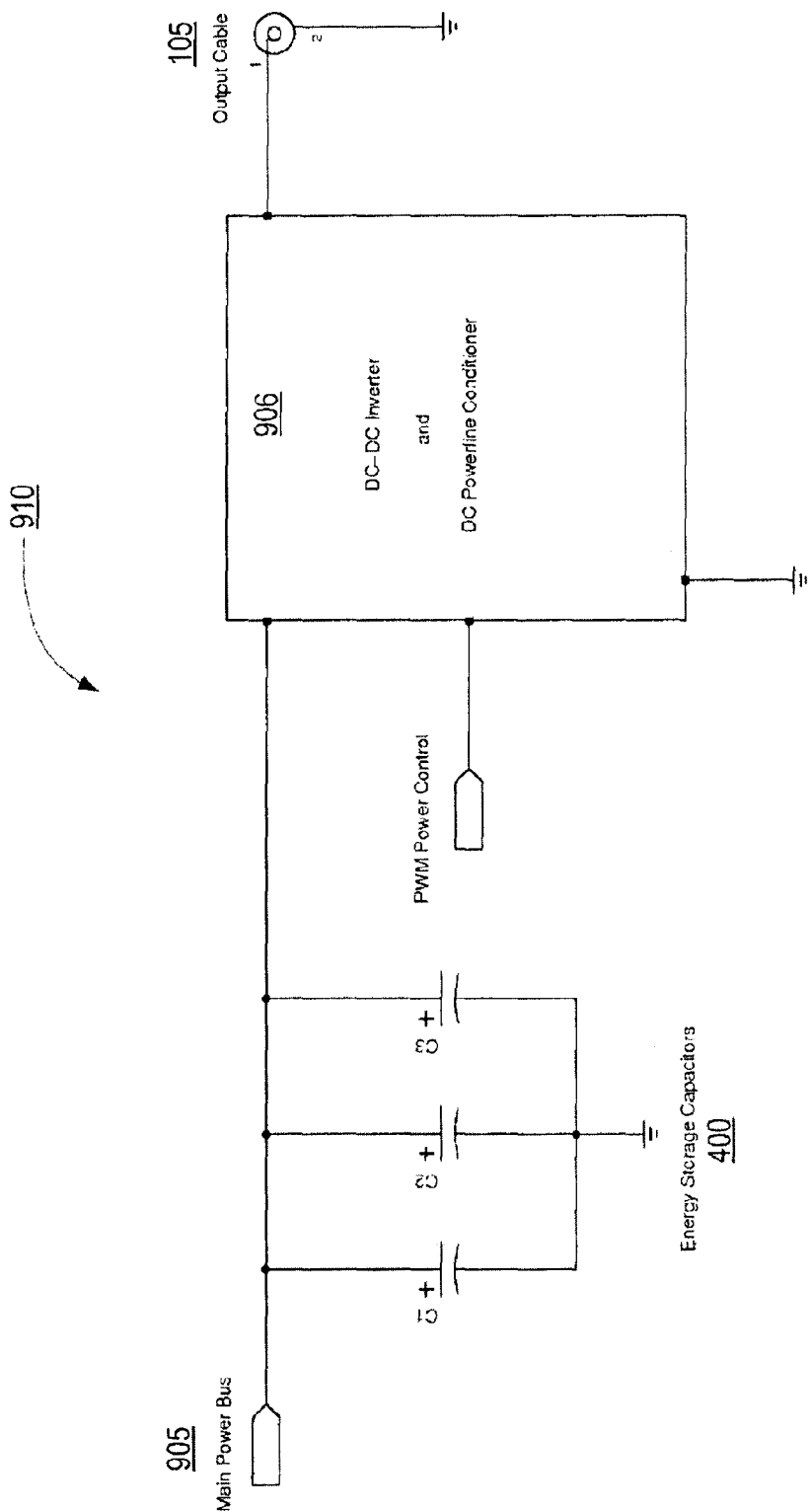

FIGS. 9A and 9B show an example of elements of the electrical system of the device. FIG. 9A shows a full bridge controller 901 and level shifter 902 associated with a single phase of the linear motor 103. A similar bridge controller and level shifter are provided for each of the other two phases. A binary signal 903 is input from the control system 200 (ie signals Q1 and "not Q1"). Signal 903 is processed via level shifter 902 for compatibility with the full bridge controller 901 for the first phase. The signal determines whether power is taken off the phase to the main power bus 905 or whether power is returned to the phase of the linear motor from the main power bus. Low-pass LC filter 904 is installed on the main power bus 905. The main power bus may be a copper bar.

FIG. 9B shows an example of the energy storage and power takeoff system. The energy storage system 400 may be a bank of capacitors (eg C1, C2 and C3) connected to the main power bus 905. This system is connected to an inverter 906 and power takeoff cable 105, connected to the outside of the case via an airtight seal 509. This may be combined with the tether 105. There may also be a direct connection between the control system's energy store and the outside of the case, without an intermediate inverter. The inverter takes control signals 903 from the control system to mediate the power drawn from the main power bus.

Control Signals for the Phase Locked Loop

As shown in FIG. 6, the control system of the wave power generator returns power to the linear motor so as to match the phase of specified input signals. In one arrangement the control systems are based on the adaptation of a PLL controller to operate at low frequencies, such as those found in ocean waves. The comparison of two signals determined by analysis of the system (obtained from sensors 102 in or on the casing of the device) in a phase detector 601 gives a signal used by the PLL to determine when to return energy to the system. This signal is normalized by the force exerted by the spring 300 connecting the casing and free mass, to ensure an appropriate amount of energy is returned to the system.

Any signal whose frequency/phase transfer function has an inflexion point where the magnitude of the relative velocity between the casing and free mass is at a maximum is suitable for locking. This is because the inflexion point corresponds to a 'phase acceleration' (the second derivative of the phase vs. frequency) of zero, i.e. a locked signal. The locking system 600, 610 tends to drive the phase acceleration to a locked state with zero phase acceleration; this is chosen to correspond to the maximum relative velocity between casing and mass because that maximum corresponds to antisymmetric resonance between the casing and mass.

Examples of signals that may be used in the PLL 600, 610 are:

a) the difference between the position of the casing and ocean (which may be measured by a capacitative or similar sensor situated on the casing);

b) the difference between the velocity of the casing and the free mass (given by a capacitative, Hall effect, or potentiometer sensor in the casing); and c) the difference between the acceleration of the casing and the acceleration of the counterweight assembly.

It is the difference between these signals that is used to lock the system, using a zero-crossing detector.

Signals are chosen for the ease by which they can be detected with simple sensors, to minimize the possibility of error or equipment failure during operation of the device. Some signals produced by the sensors may be suitable for use directly, and others may need to be fed through intermediate processors to be useful (for example, phase shifters).

Figure 10:
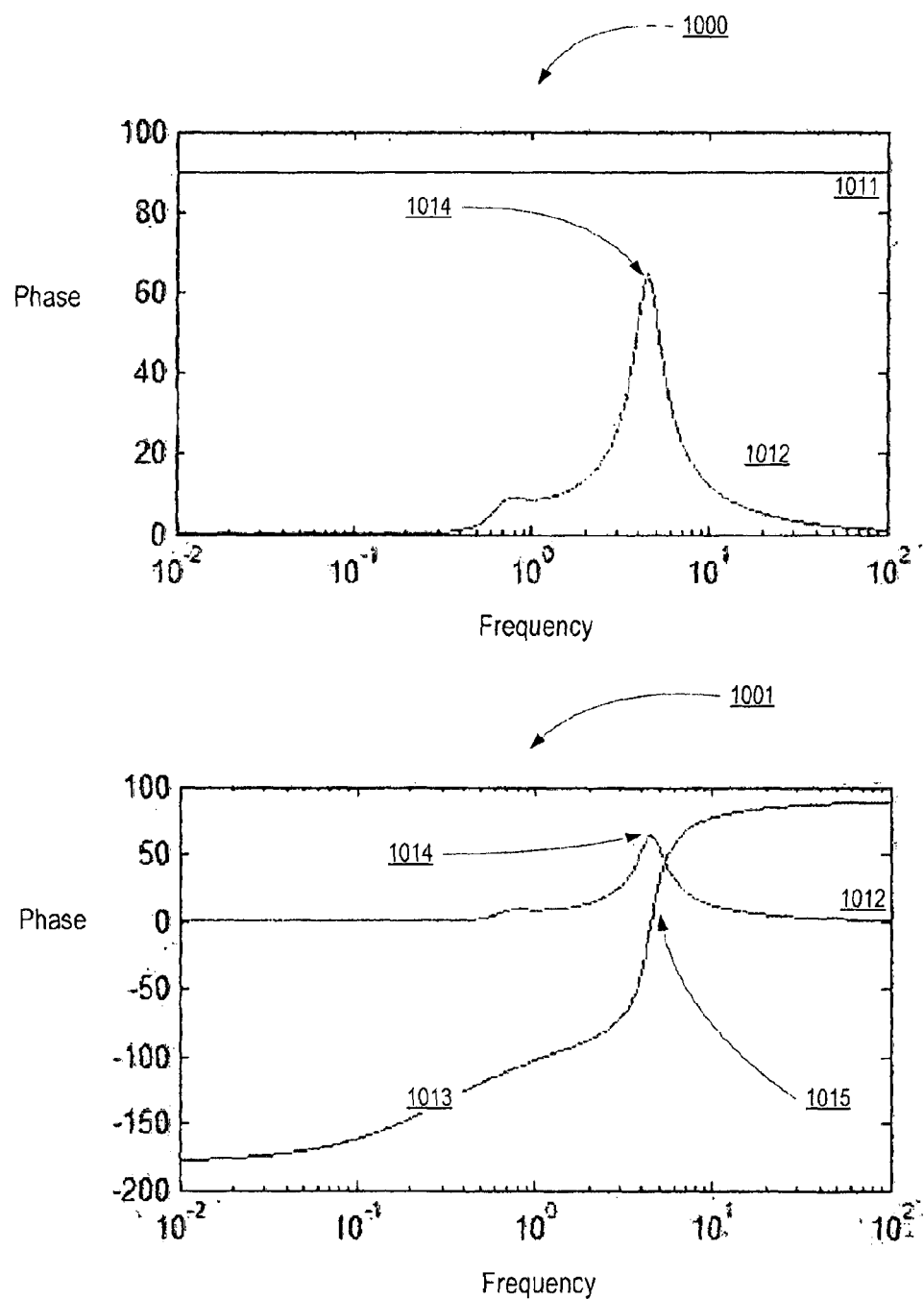
FIG. 10 shows bode plots illustrating the validity of different control signals for an embodiment of the device.

A linear analysis of a simple driven, damped, two-spring, two-mass system was used to determine signals for use with the control system. In this analysis, the springs correspond to the buoyancy of the casing and the restoring force device between the casing and free mass, and the masses represent the casing and free mass. Bode phase/frequency plots were generated from the linear analysis comparing the frequency response of particular signals with a superimposed plot of the magnitude of the relative velocity of the casing and mass. Two examples of such Bode plots are shown in FIG. 10. Plot 1000 is an example where the signal under evaluation proved unsuitable, and plot 1001 is an example of an analysis that shows a suitable locking signal for use in the control system. In each of the plots 1000,1001 curve 1012 represents the magnitude of the relative velocity of the casing and the mass. The maximum 1014 of the magnitude of the relative velocity of casing and mass corresponds to antisymmetric motion between them as described above. This maximum was used to identify signals locking to an appropriate point.

Bode plot 1000 in FIG. 10 shows an unsuitable locking signal: the difference between the phase of the relative velocity between the casing and mass and the relative position of these bodies, represented as curve 1011. There is no phase response observed in this signal 1011.

Bode plot 1001 in FIG. 10 shows a suitable locking signal 1013: the difference between the phase of the relative height between the casing and the ocean, and the relative velocity between the casing and the free mass. The Bode plot 1001 indicates that this locking signal is preferable to that of plot 1000 as it has an inflexion point 1015 corresponding to the magnitude peak 1014. This indicates that a locking system based on this signal produces the desired antisymmetric resonance between casing and free mass.

A large number of potentially useful signals can be directly sensed or derived from the system and any of these may be used in the wave power generators described herein if they are found to be effective. For example, other signals with appropriate locking points are:

the relative position of the casing and mass;
the difference between the relative position of the casing and ocean, and the relative position of the casing and mass;
the difference between the relative position of the casing and ocean, and the relative velocity of the mass; and
the difference between the relative position of the casing and mass, and the relative velocity of the casing and mass.

It will be understood that variables intrinsic to the components of the system and not directly related to a co-ordinate determined from the ocean are more desirable, due to the difficulty in defining the relative position between the casing and ocean.

As mentioned above, other forms of controller may also be used, for example optimal control, which do not necessarily require this specific phase relationship. For example, an optimal controller may take the relative position of the casing and mass and the force currently being applied to them (measured with an accelerometer) as an input. Such a signal is sufficient to serve as a cost function enabling the return of a parameter used to control the application of force to the system.

Example

Figure 7:
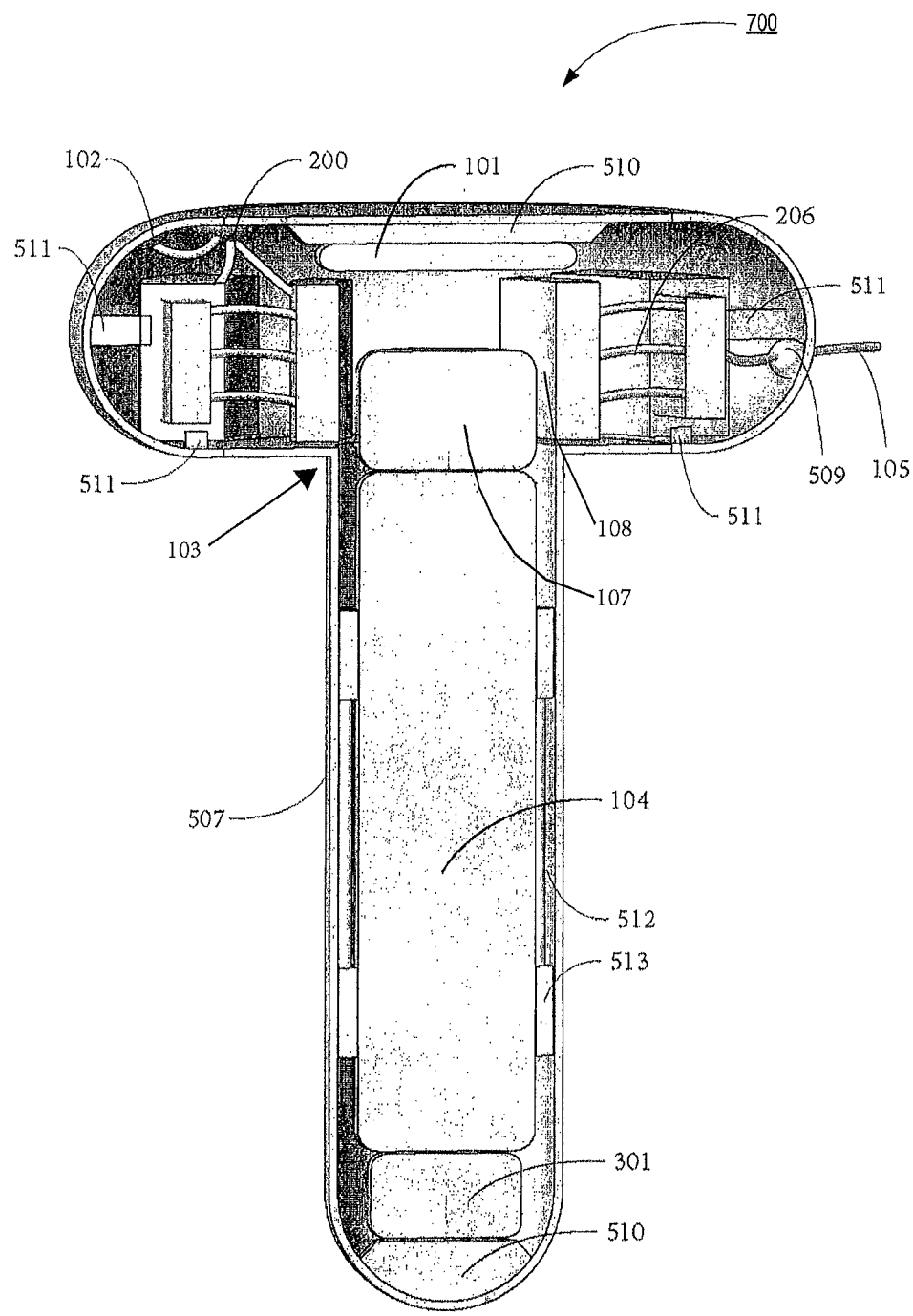
FIG. 7. shows a schematic of an embodiment of the wave power generator.

FIG. 7 is an example of a wave generator device 700. As illustrated, the buoy's vertical axis is much longer than its horizontal axis, though this is variable depending on ocean conditions and the optimization of the device's performance. device 700 has an elongate cylindrical lower portion that houses a rolling lobe air spring 301 positioned on a mounting 510a at the base of the casing 507. A free mass including counterweight 104 and the linear motor's field source 107 moves along linear bearings 512,513 up and down the vertical axis of the device 700.

The upper cylindrical portion of device 700 houses the armature 108 of linear motor 103. the three phases 206 of the linear motor 103 are connected to the combined energy management and control system. This system enables the conversion of the AC generated in the linear motor phases to DC via three full bridge controllers. These controllers enable energy to be returned directly to the phases of the motor.

This system incorporates full bridge controllers attached to each phase of the linear motor. These phases are in turn connected to an energy storage mechanism and a power takeoff 105. These full bridge controllers and energy storage mechanism are controlled by a control system.

Mounts 511 are provided to hold the linear motor 103 in the upper cylindrical portion. A shock absorber 101 is mounted at the top of device 700 to limit the impact of the free mass on the casing 507. Several sensors 102 are located in the device, in data communication with the controller 200, which is also in data communication with the linear motor 103.

The linear motor 103 in device 700 is optimized for efficiency at high-power, low-precision operation. Motors of this kind are used in compressors for ultra-low temperature cooling devices used in cryogenic applications, such as the QDrive STAR motor series; or in roller coasters such as Intamin's LSM roller coaster. The device may be a permanent-magnet motor such as these or a doubly-fed device with an excited field source. The device may have a three-phase stator and a three-phase rotor. The motor is connected to a standard full-bridge controller with its output and control mechanism connected to the control system.

The device 700 may have a diameter of several meters (for example 4 m) and a height approximately 3 to 5 times the diameter (for example 12 m). Different sizes may be appropriate for different applications.

Figure 8:
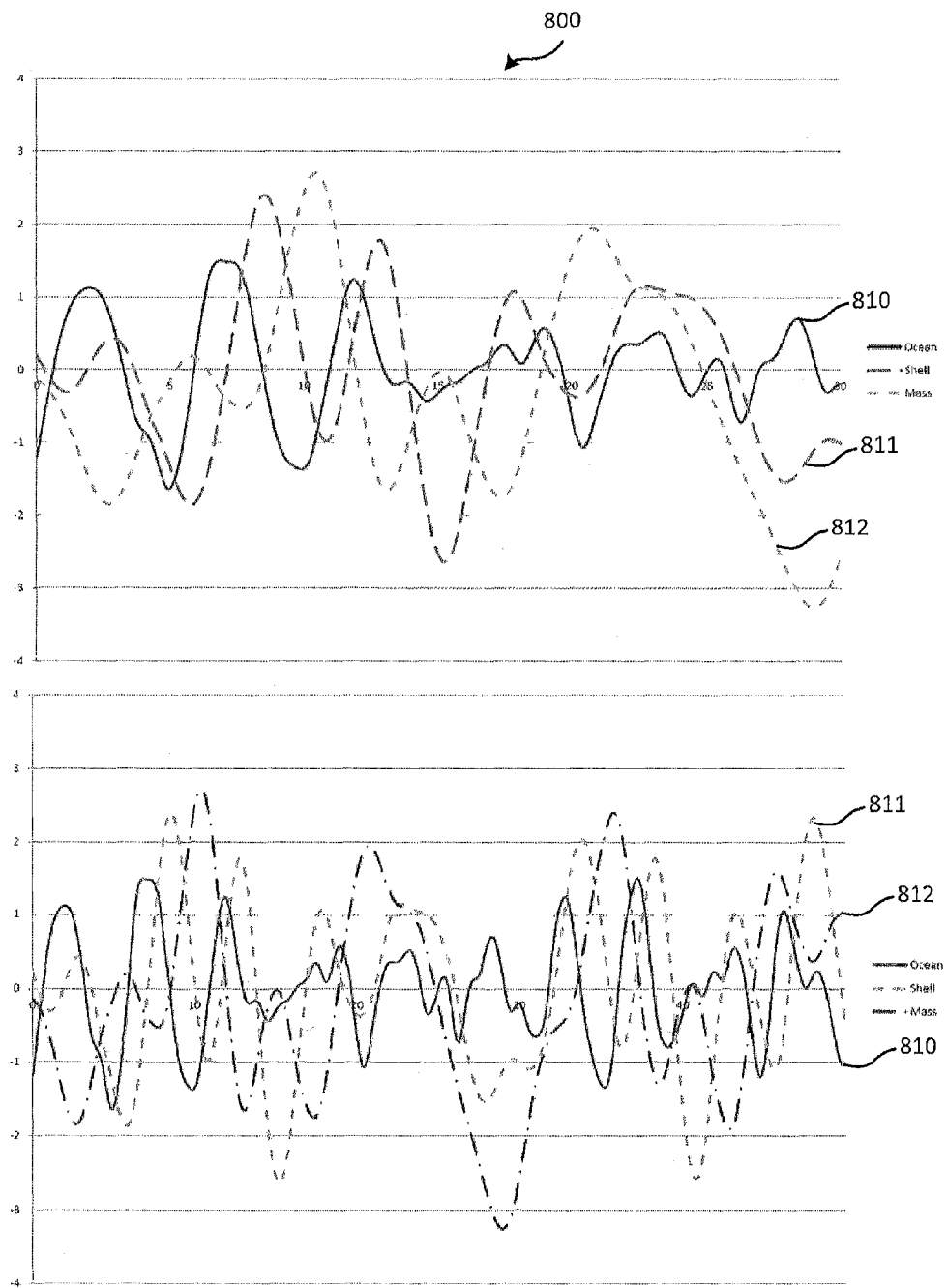
FIG. 8. shows graphs of the simulated motion of the wave power generator incorporating an electrical system and operating in simulated ocean conditions.

FIG. 8 shows the results of a simulation 800 of the device incorporating a full simulated electrical system operating on simulated ocean waves 810 similar to the wave profile of a real ocean. Curve 811 shows the simulated motion of the shell and curve 812 shows the simulated motion of the mass. FIG. 8 shows the same simulation twice. The lower plot covers a longer period of time. In the central portion of the lower plot, turbulent ocean waves disrupt the locking of the device. However, control is re-established.

As the device 700 operates, driven by the ocean, the field source and armature of linear motor 103 move at different velocities. This generates AC power in the three phases of the linear motor which is converted to DC and stored in the energy storage device 400.

Stored energy is returned to the linear motor, applying a force to the mass/field source and armature/casing with direction and intensity determined by control system 200. Addition of energy to the system in this manner changes the motion of the components so that the field source/mass system exhibits motion shifted by 180° to the armature/casing (i.e. antisymmetric resonance between the two).

Simulations of the operation of the device indicate that near-perfect resonance can be achieved in realistic ocean conditions. In the absence of active control there is a natural tendency for this system to drift out of resonance due to energy losses in any real system, for example because of friction. This is counteracted by the return of energy to the system at times determined by the control system 200.

The control system uses inputs from the sensors to optimize the movement of power throughout the electrical system of the device. The power takeoff may be connected to an inverter inside or outside the buoy. The device requires no mechanical ground, and may utilize a combined power takeoff and tether cable to keep it from drifting out to sea when connected to an object in the ocean (such as a ship, pier, offshore drilling rig, or offshore wind turbine) or a fixed mooring (such as a plate attached to the seafloor or a monopole foundation).

FIG. 4 shows an example of the 'control signal' 420 produced by the control system. This control signal is normalized by multiplication with the force due to the spring 301 connecting the casing and the mass at a given point. This force is detected by another sensor in the system. This arrangement ensures that the energy returned to the system is proportional to the amplitude of the prevailing wave motion. Returning more energy than this would be inefficient, as it would increase the relative proportion of energy added to energy extracted. Returning less would be insufficient to maintain a close enough lock to maximize energy extraction.

A simulation of an idealized device, with no modelling of electrical components, indicates a significant increase in power output in the controlled vs uncontrolled case. Analysis of the position of the components of the system in both cases also shows the control system taking effect, keeping the motion of the casing and mass nearly at antisymmetric resonance. More energy is produced overall because keeping the casing-mass system in antisymmetric resonance maximizes the average difference in velocity over time, which is how power is produced (the casing and mass being connected to the linear motor armature and field source respectively).

A simulation incorporating the electrical system indicates an identical effect, albeit with additional damping (modelled as the native inductance and resistance of the linear motor). This serves to confirm that the control system can successfully cause more power to be extracted in a device where the casing and mass move in antisymmetric resonance than a device where the casing moves relative to a mechanical ground or anchor.

Figure 11:
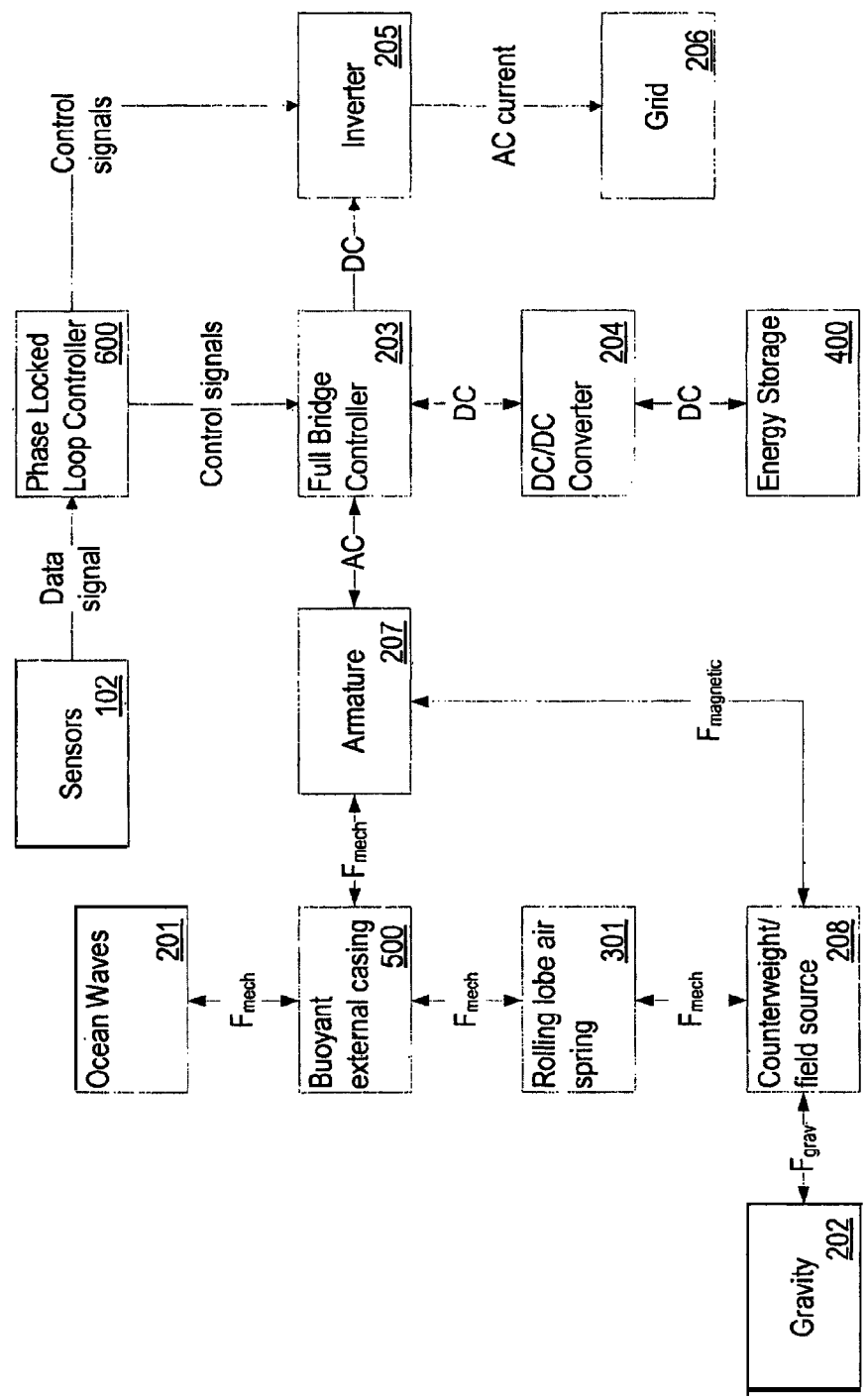
FIG. 11 is a schematic block diagram illustrating how forces and signals are exchanged between components of the wave power generator.

FIG. 11 is a block diagram that illustrates how the components of the wave power generator exert forces on one another and how current and data signals are exchanged within the generator.

The ocean waves 201 and the buoyant external casing 500 exert mechanical force on one another. The casing is mechanically coupled to the armature 207 of the electric machine 103 and also to the rolling lobe air spring 301. The counterweight assembly 208 that includes counterweight 104 and the field source of the electric machine 103 moves within the casing under the influence of gravity 202. The armature 207 and field source are magnetically coupled when the electric machine is operating as a generator or motor.

AC is transferred between the armature 207 and the full bridge controller 203 for each phase. DC is exchanged between the full bridge controller 203 and energy storage 400 via a DC/DC converter 204.

DC from the full bridge controller 203 may flow to an inverter 205, as determined by control signals from the phase lock loop controller 600. An AC output of the inverter 205 may be provided to the grid 701. Data signals from sensors 102 are provided to the controller 600, from which control signals are provided to the full bridge controller 203 and inverter 205.

The device may operate in a solely AC regimen, removing the need for DC converters, in which the field source of the linear motor has three excited phases that generate three phases of AC power in the stator coils of the motor. The controllers act to manage current flow through the system.

High Frequency Operation—PLL Locking Device to Ocean Waves

In an alternate embodiment, the PLL instead locks the wave power generator to the ocean waves, so that the casing moves in symmetric resonance to a multiple of the ocean wave period. This can be achieved by locking to a signal that varies with a multiple of the ocean period (for example, the analytical derivative of the ocean wave's height squared, or simply its magnitude).

Motion at a multiple of the ocean wave frequency is not a natural resonance, and requires an increased input of energy from the energy storage device. For devices of the imagined scale it also reduces the relative velocity of the casing and mass during operation, thereby decreasing the power output. However, this arrangement allows the mass of the components to be reduced while providing for similar operational parameters, which may be of use in particular coastal and offshore environments. This embodiment is more useful in larger implementations, where the distance the field source needs to traverse is larger. This means the average relative velocity of the field source and armature becomes significantly higher, though simulations indicate the power output is still not able to match that of the primary embodiment.

Note that this alternative control system may be replaced with a larger number of PLLs, or with a single PLL that takes different signals as its inputs. For example, various signals and their phase-shifted counterparts could be used to synthesize frequency-doubled signals for input into the PLL's frequency detector. For example, in another alternate embodiment, the PLL is replaced with two PLLs in order to cause the casing-mass system to continue resonating antisymmetrically while moving in parametric resonance with the ocean—i.e. at a multiple of the frequency of the 'driving' ocean wave.

Thus, by changing the control signals used in the PLL, and adding additional phase detectors if required by the control signals chosen, the device can be made to function at integer multiples of the period of the driving ocean waves. The device may continue to operate with the mass and casing in antisymmetric resonance, or simply lock the motion of the casing to a multiple of the period of the ocean waves.

This enables the device to be constructed with a proportionally lighter free mass. The effect of this control system change can be enhanced by changing the shape of the external casing. For example, an implementation would feature a casing shaped like two cones joined near their tips (e.g. casing 506). This causes the incident period of the wave to double its effect on the motion of the buoy, making its natural resonance twice the period of a given incident wave. Other shapes are possible for other multiples, generally involving a distribution of bulges on the external casing.

Horizontal Resonance

In the device 700, the wave power generator is locked to the vertical period of the waves with a compensation built in for their horizontal component (that may be a source of additional power). Certain applications (e.g. near the coast) may call for a device that does not resonate horizontally as well as vertically; this requires the motion of the field source to be unaffected by any horizontal drift or tilt off the vertical axis of the buoy. This can be achieved with a wide conical body, for example casings 504, 505, where the functional components of the device are suspended within a second, internal casing, itself suspended from the external casing on two axles with rotational bearings. The inside of the external casing are here lined with force absorbing materials or devices to prevent accidental damage to the functional components due to the internal casing crashing into the external casing due to particularly violent wave motion or wear on the axles.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A wave power generator comprising:
   a buoyant casing intended to float in a body of water;
   an electric machine located within the casing comprising an armature and a field source, the electric machine having a fixed part coupled to the casing and a moving part;
   a counterweight assembly that is movable within the casing, comprising the moving part of the electric machine and wherein a relative movement of the counterweight assembly and the fixed part of the electric machine generates electric power;
   power storage that stores power generated by the electric machine;
   a control system that determines a bi-directional energy flow between the power storage and the armature, wherein energy is returned to the electric machine to drive a motion of the counterweight assembly anti-symmetrically to a motion of the casing such that the motion of the counterweight assembly is in antiphase with and has the same amplitude as the motion of the casing.

2. A wave power generator according to claim 1 comprising a restoring force device located between the casing and the counterweight assembly, the restoring force device exerting a restoring force on the counterweight assembly if the assembly moves within the casing.

3. A wave power generator according to claim 2 wherein the restoring force device comprises at least one of: an air spring, a rolling-lobe air spring, an elastomer bushing, a spring and a pneumatic piston.

4. A wave power generator according to claim 1 comprising a plurality of sensors in data communication with the control system, the sensors providing data signals indicative of at least one of:
  a position of the casing;
  a position of the counterweight assembly;
  a velocity of the casing;
  a velocity of the counterweight assembly;
  an acceleration of the casing;
  an acceleration of the counterweight assembly;
  electrical current in the phase or phases of the electrical machine;
  the voltage across the phase or phases of the electrical machine;
  the electrical current flowing through power distribution components of the electrical machine;
  the electrical current flowing through the electrical components of the power control electronics;
  the voltage across the power distribution components of the electrical machine;
  the voltage across the electrical components of the power control electronics; and
  the phase of current in the phase or phases of the electrical machine.

5. A wave power generator according to claim 4 wherein the control system comprises a phase lock loop (PLL) that acts to lock a phase of a first signal to a phase of a second signal.

6. A wave power generator according to claim 5 wherein a signal input to the PLL is selected from the group consisting of:
  a difference between a position of the casing and the surface of the ocean;
  a difference between a velocity of the casing and a velocity of the counterweight assembly; and
  a difference between an acceleration of the casing and an acceleration of the counterweight assembly.

7. A wave power generator according to claim 1 wherein the armature comprises three phases of the electric machine.

8. A wave power generator according to claim 7 wherein each phase is associated with a full bridge controller that permits bidirectional flow between the phases and the power storage.

9. A wave power generator according to claim 1 comprising a power takeoff circuit that outputs generated electric power from the wave power generator.

10. A wave power generator according to claim 9 wherein the power takeoff circuit comprises a cable that acts as a tether for the wave power generator.

11. A wave power generator according to claim 1 comprising linear bearings aligned with a vertical axis of the casing, the counterweight assembly moving along the linear bearings within the casing.

12. A wave power generator according to claim 1 wherein the casing comprises an elongate cylinder.

13. A wave power generator according to claim 12 wherein the elongate cylinder comprises a lower portion substantially accommodating the counterweight assembly and an upper portion accommodating the fixed part of the electric machine, wherein a diameter of the upper portion is greater than a diameter of the lower portion.

14. A wave power generator according to claim 1 wherein the casing is conical.

15. A wave power generator according to claim 14 wherein the casing comprises an upper conical portion that tapers to an intermediate neck and a lower conical portion that broadens away from the intermediate neck.

16. A wave power generator according to claim 1 wherein the control system determines the bi-directional energy flow dependent on an integer multiple of a period of waves in the body of water.

17. A wave power generator according to claim 1 wherein at least the fixed part of the electric machine and counterweight assembly are located in a second housing positioned within the buoyant casing and rotatable relative to the buoyant casing to maintain a substantially vertical orientation of the second housing.

18. A wave power generator according to claim 1 comprising braking means that restrain motion of the counterweight assembly relative to the casing.

19. A wave power generator according to claim 18 comprising means for activating the braking means if a motion of the generator exceeds a specified threshold, or based on a signal from an external source.

20. A wave power generator according to claim 1 wherein the fixed part of the electric machine comprises the armature and the moving part comprises the field source.

21. A wave power generator according to claim 1 wherein the fixed part of the electric machine comprises the field source and the moving part comprises the armature.

22. A method of generating electrical power comprising:
  a) deploying a wave power generator in a body of water, the generator comprising:
    i) a buoyant casing;
    ii) an electric machine located within the casing comprising an armature and a field source, the electric machine having a fixed part coupled to the casing and a moving part;
    iii) a counterweight assembly that is movable within the casing, comprising the moving part of the electric machine and wherein a relative movement of the counterweight assembly and the fixed part of the electric machine generates electric power; and
    iv) power storage that stores power generated by the electric machine;
  b) determining a bi-directional energy flow between the power storage and the armature, and
  c) returning energy to the electric machine based on the determined energy flow, to drive a motion of the counterweight assembly anti-symmetrically to a motion of the casing such that the motion of the counterweight assembly is in antiphase with and has the same amplitude as the motion of the casing.

* * * * *